(12) United States Patent
Nakamura et al.

(10) Patent No.: US 11,619,267 B2
(45) Date of Patent: Apr. 4, 2023

(54) MANUFACTURING METHOD FOR UPPER CASE OF STRUT BEARING, AND STRUT BEARING

(71) Applicant: NAKANISHI METAL WORKS CO., LTD., Osaka (JP)

(72) Inventors: Masayoshi Nakamura, Osaka (JP); Yasuhiro Narazaki, Osaka (JP)

(73) Assignee: NAKANISHI METAL WORKS CO., LTD., Osaka (JP)

( * ) Notice: Subject to any disclaimer, the term of this patent is extended or adjusted under 35 U.S.C. 154(b) by 0 days.

(21) Appl. No.: 17/201,802

(22) Filed: Mar. 15, 2021

(65) Prior Publication Data

US 2021/0324916 A1 Oct. 21, 2021

(30) Foreign Application Priority Data

Apr. 15, 2020 (JP) .............................. JP2020-072641

(51) Int. Cl.
*F16C 35/04* (2006.01)
*B29C 45/26* (2006.01)
(Continued)

(52) U.S. Cl.
CPC ........ *F16C 35/042* (2013.01); *B29C 45/2628* (2013.01); *F16C 19/12* (2013.01);
(Continued)

(58) Field of Classification Search
CPC .......................... F16C 35/042; B29C 45/2628
(Continued)

(56) References Cited

U.S. PATENT DOCUMENTS 2,133,019 A * 10/1938 Campbell ................ B29D 1/00
 249/59
4,079,475 A * 3/1978 Thompson .......... B29C 45/2618
 425/441

(Continued)

FOREIGN PATENT DOCUMENTS

| GB | 2115889 A | * | 9/1983 | ............. B29C 45/26 |
| JP | 2003535740 A | | 12/2003 | |
| WO | WO-0192040 A1 | * | 12/2001 | ........... B60G 15/063 |

OTHER PUBLICATIONS

Machine translation WO0192040A1 (Year: 2001).*

*Primary Examiner* — Matthew J Daniels
*Assistant Examiner* — Wayne K. Swier
(74) *Attorney, Agent, or Firm* — Innovation Capital Law Group, LLP; Vic Lin

(57) ABSTRACT

An upper case manufacturing method using an axial draw mold, in molding of an upper case made of a synthetic resin and including an inclined cylindrical portion. A fixed mold is provided with a first half body, and a movable mold is provided with a second half body. The first half body and the second half body abut against each other in an inclined plane. The first half body has a first flat surface at both ends on the inner diameter side of the inclined cylindrical portion in the inclined plane, and the second half body has a second flat surface at both ends on the inner diameter side of the inclined cylindrical portion in the inclined plane. The first flat surface and the second flat surface are flat surfaces that prevent the occurrence of undercutting when the upper case is removed from an injection molding mold.

5 Claims, 6 Drawing Sheets

(51) Int. Cl.
*F16C 19/12* (2006.01)
*B29L 31/04* (2006.01)

(52) U.S. Cl.
CPC ....... *B29L 2031/04* (2013.01); *F16C 2220/04* (2013.01); *F16C 2326/05* (2013.01)

(58) Field of Classification Search
USPC ........................................................ 267/220
See application file for complete search history.

(56) References Cited

U.S. PATENT DOCUMENTS

| | | | | |
|---|---|---|---|---|
| 4,633,932 | A | * | 1/1987 | Ferguson ............... B22D 25/02 164/346 |
| 5,467,971 | A | * | 11/1995 | Hurtubise ............ B60G 15/068 280/124.147 |
| 2002/0096953 | A1 | * | 7/2002 | Shingai ................. F16C 35/042 310/90 |
| 2017/0158012 | A1 | * | 6/2017 | Hubert ..................... B60G 7/02 |
| 2019/0184781 | A1 | | 6/2019 | Montboeuf et al. |

* cited by examiner

MANUFACTURING METHOD FOR UPPER CASE OF STRUT BEARING, AND STRUT BEARING

BACKGROUND OF THE INVENTION

Field of the Invention

The present invention relates to a manufacturing method for an upper case of a strut bearing for use in a vehicle strut suspension.

Description of the Background Art

As a suspension supporting a wheel on the body of a vehicle by means of a coil spring and including a shock absorber for absorbing vertical vibrations, there is a strut suspension in which an extendable strut containing a shock absorber is fixed to an axle. The strut suspension is widely used, mainly, for a front wheel of an automobile.

As a strut bearing for use in an upper portion of a vehicle strut suspension, there is a strut bearing in which an upper case for holding an upper raceway ring and a lower case for holding a lower raceway ring are molded using a synthetic resin (e.g., see Patent Documents 1 and 2).

For example, a polyamide-based resin, which is an engineering plastic, is used as the synthetic resin for molding the upper case and the lower case ([0045] of Patent Document 1). In the case of a strut bearing of a rolling bearing type, load is locally concentrated on the rolling element portion. Accordingly, it is necessary to increase the rigidity of the upper case and the lower case. For this reason, a reinforced grade in which reinforced fibers such as glass fibers are added is used as the synthetic resin (e.g., [0007] of Patent Document 2).

CITATION LIST

Patent Documents

[Patent Document 1] U.S. Patent Application Publication No. 2019/0184781
[Patent Document 2] JP Patent Application Publication (translation of PCT application) No. 2003-535740

Some upper cases made of a synthetic resin include a cylindrical portion inclined with respect to the central axis of the strut bearing (see, e.g., FIG. 1 of Patent Document 1). If an axial draw mold that has a common mold structure in which the central axis of the upper case (the central axis of the strut bearing) and the opening direction of a molding mold are coaxial, is used upon injection-molding of such upper cases, a part of the cylindrical surface of the inclined cylindrical portion on the inner diameter side has an undercut shape.

Due to high rigidity of a molded product formed of a thermoplastic resin material containing reinforced fibers, a large stress is exerted on the molded product when the axial draw mold is opened in the axial direction and forcibly extracted. This results in deformation or damage of the molded product.

As a countermeasure against such a problem, it is conceivable to use, for example, a nest or an inclined core to open the mold in the axial direction of the inclined cylindrical portion. However, such a countermeasure increases the complexity of the mold structure, so that the initial cost and the maintenance cost of the mold are increased. This increases the molding cost of the upper case.

SUMMARY OF THE INVENTION

An object of the present invention is to provide an upper case manufacturing method that can prevent deformation or damage of a molded product, while using an axial draw mold having a common mold structure, in molding of an upper case made of a synthetic resin and including a cylindrical portion inclined with respect to the central axis of a strut bearing.

The subject matter of the present invention is as follows.

(1)

A manufacturing method for an upper case of a strut bearing, the strut bearing including:

an upper case to be fixed to an upper end portion of a strut of a vehicle strut suspension;

a lower case to be directly or indirectly connected to a coil spring disposed on an outer side of the strut;

an upper raceway ring held by the upper case;

a lower raceway ring held by the lower case; and a rolling element that rolls between the upper raceway ring and the lower raceway ring;

the upper case and the lower case being made of a synthetic resin; and the upper case including an inclined cylindrical portion inclined with respect to a central axis of the strut bearing, the manufacturing method including:

producing the upper case by injection molding using an injection molding mold that is an axial draw mold including a fixed mold and a movable mold; and providing the fixed mold with a first half body, and providing the movable mold with a second half body, in which the first half body and the second half body abut against each other in an inclined plane, the first half body has a first flat surface at both ends on an inner diameter side of the inclined cylindrical portion in the inclined plane, the second half body has a second flat surface at both ends on the inner diameter side of the inclined cylindrical portion in the inclined plane, and the first flat surface and the second flat surface are flat surfaces that prevent occurrence of undercutting when the upper case is removed from the injection molding mold.

(2)

The manufacturing method for an upper case of a strut bearing according to (1), in which when an inclination direction of a central axis of the inclined cylindrical portion with respect to the central axis of the strut bearing is a forward direction, the inclined plane extends in a left-right direction, an inclination angle of the inclined plane with respect to a vertical plane including the left-right direction is less than 10° if the injection molding mold is a vertical mold that opens upward and downward, and an inclination angle of the inclined plane with respect to a horizontal plane including the left-right direction is less than 10° if the injection molding mold is a horizontal mold that opens leftward and rightward.

(3)

The manufacturing method for an upper case of a strut bearing according to (1) or (2), in which when the fixed mold and the movable mold are cut in a plane orthogonal to a central axis of the inclined cylindrical portion in a state where the injection molding mold is closed, a length of a rectangular flat surface formed by the first flat surface and the second flat surface is less than or equal to 10% of a circumferential length of the fixed mold and the movable mold.

(4)

A strut bearing including:

an upper case to be fixed to an upper end portion of a strut of a vehicle strut suspension;

a lower case to be directly or indirectly connected to a coil spring disposed on an outer side of the strut;

an upper raceway ring held by the upper case;

a lower raceway ring held by the lower case; and a rolling element that rolls between the upper raceway ring and the lower raceway ring, the upper case and the lower case being made of a synthetic resin, in which the upper case includes an inclined cylindrical portion inclined with respect to a central axis of the strut bearing, and when an inclination direction of a central axis of the inclined cylindrical portion with respect to the central axis of the strut bearing is a forward direction, the upper case has rectangular flat surfaces respectively on left and right sides of a central portion in a front-rear direction on an inner diameter side of the inclined cylindrical portion.

In the above-described manufacturing method for an upper case of a strut bearing according to the present invention, in the injection molding mold that is an axial draw mold including a fixed mold and a movable mold, the fixed mold is provided with a first half body, and the movable mold is provided with a second half body. The first half body and the second half body abut against each other in the inclined plane. The first half body has a first flat surface at both ends on the inner diameter side of the inclined cylindrical portion in the inclined plane, and the second half body has a second flat surface at both ends on the inner diameter side of the inclined cylindrical portion in the inclined plane. Furthermore, the first flat surface and the second flat surface are flat surfaces that prevent the occurrence of undercutting when the upper case is removed from the injection molding mold.

Injection-molding of the upper case using the injection molding mold, which is the axial draw mold as described above, is performed so that any undercut shape of the upper case on the inner diameter side of the inclined cylindrical portion can be eliminated. Accordingly, it is possible to prevent deformation or damage of the upper case, while using an axial draw mold having a common mold structure. Thus, the mold structure will not be complicated, so that the initial cost and the maintenance cost of the mold can be reduced, and it is therefore possible to reduce the molding cost of the upper case and increase the molding productivity.

DESCRIPTION OF THE PREFERRED EMBODIMENTS

Hereinafter, embodiments according to the present invention are described with reference to the drawings. An upper case 1 according to the present invention includes an inclined cylindrical portion 2 inclined with respect to a central axis of a strut bearing. It is assumed that a direction along which the central axis (B in FIGS. 1B and 2) of the inclined cylindrical portion 2 is inclined with respect to the central axis (A in FIGS. 1B and 2) of the strut bearing is the forward direction (arrow F in FIGS. 1B and 2), and the front-rear direction, the left-right direction, and the up-down direction are defined with respect to the forward direction.

<Upper Case>

Figure 1A:
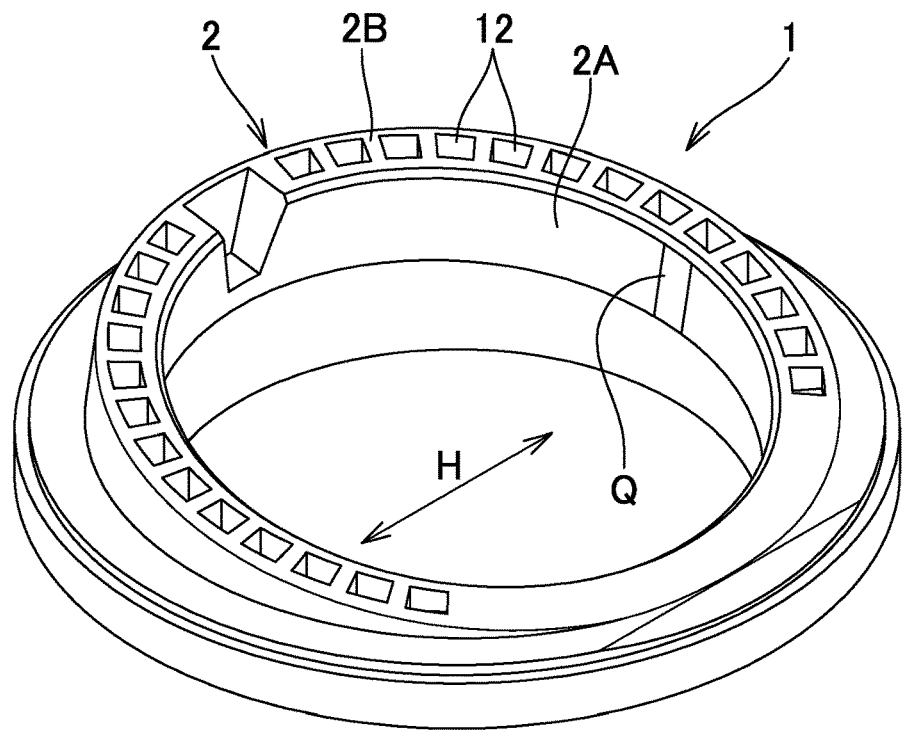
FIG. 1A is a perspective view showing an upper case manufactured by a manufacturing method according to an embodiment of the present invention.
Figure 1B:
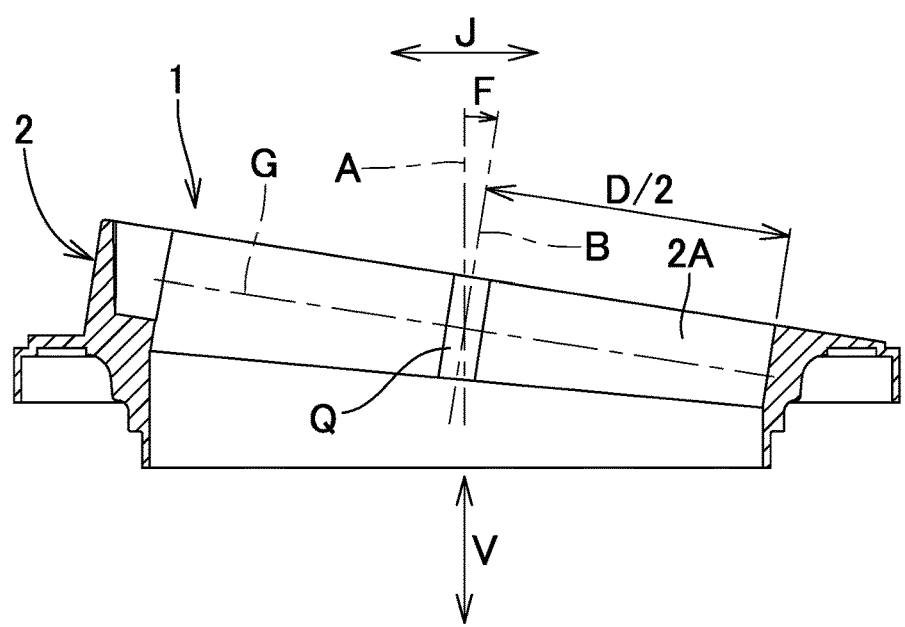
FIG. 1B is a vertical cross-sectional view of the upper case.
Figure 2:
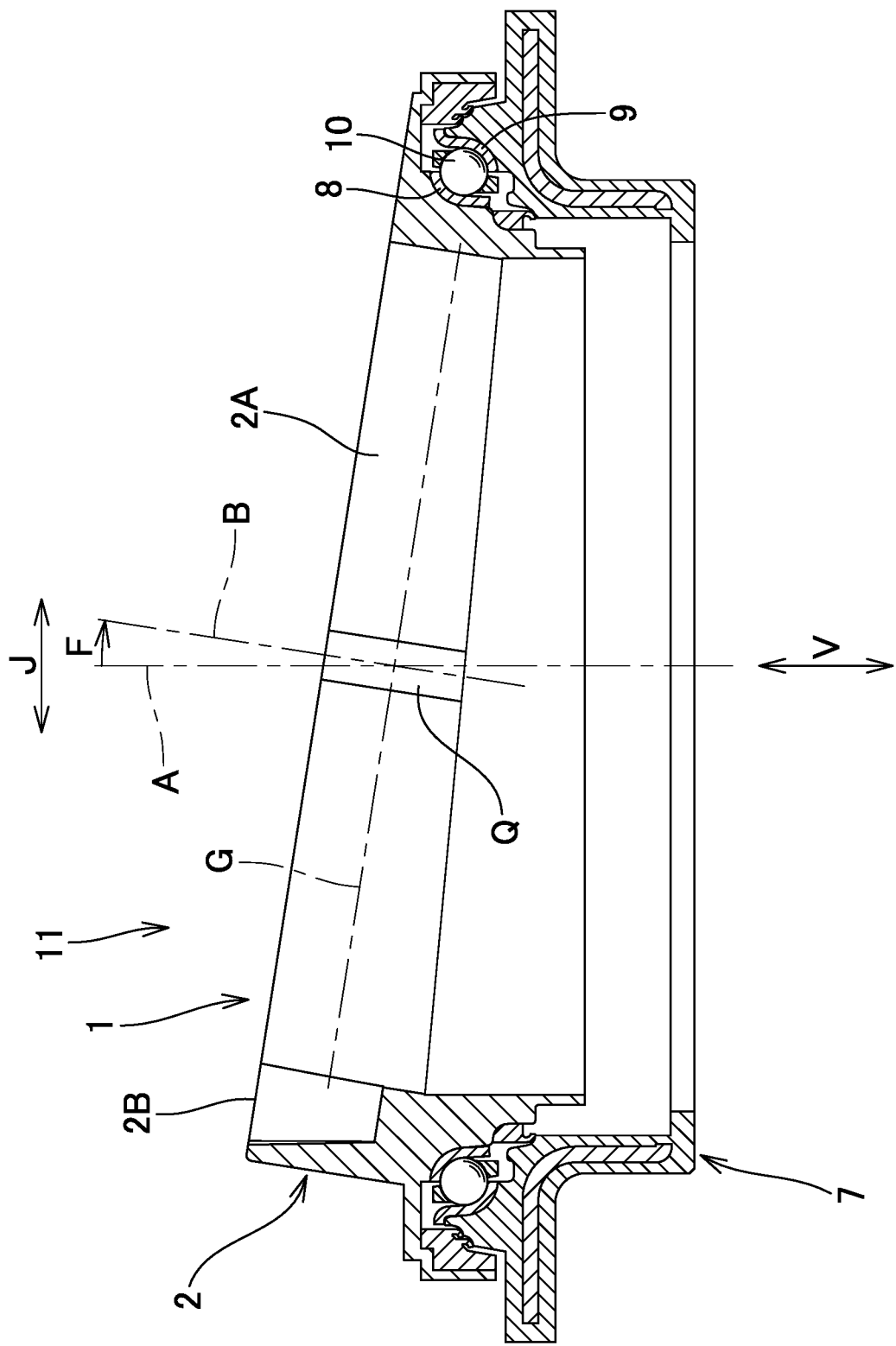
FIG. 2 is a vertical cross-sectional view of a strut bearing including the upper case.

As shown in the perspective view of FIG. 1A and the vertical cross-sectional view of FIG. 1B, an upper case 1 manufactured by a manufacturing method according to an embodiment of the present invention includes an inclined cylindrical portion 2 inclined with respect to the central axis A of a strut bearing 11 (FIG. 2). The upper case 1 has rectangular flat surfaces Q respectively on left and right sides (see the left-right direction H in FIG. 1) of a central portion (the center and front and rear regions thereof) in the front-rear direction J on the inner diameter side of the inclined cylindrical portion 2. "Rectangular" includes a trapezoid, a parallelogram, and the like that are similar to a rectangle. The rectangular flat surfaces Q are formed during molding using an injection molding mold in a manufacturing method for the upper case 1, which will be described later. As shown in FIG. 1A, a plurality of square thinned-out portions 12, which enable axial draw, are circumferentially disposed in an end face 2B of the inclined cylindrical portion 2.

<Strut Bearing>

As shown in the vertical cross-sectional view of FIG. 2, the strut bearing 11 includes, for example, an upper case 1 to be fixed to an upper end portion of a strut of a vehicle strut suspension, a lower case 7 to be directly or indirectly connected to a coil spring disposed on the outer side of the strut, an upper raceway ring 8 held by the upper case 1, a lower raceway ring 9 held by the lower case 7, and rolling elements 10 that roll between the upper raceway ring 8 and the lower raceway ring 9.

The upper raceway ring 8 and the lower raceway ring 9 are made of steel, and the upper case 1 and the lower case 7 are made of a synthetic resin.

The synthetic resin forming the upper case 1 and the lower case 7 is, for example, a polyamide-based resin (PA66, PA46, PA612, PA6, PA9T, PA10T, or the like), and contains, for example, 20 to 60 wt % of glass fibers (GF) as reinforced fibers.

<Injection Molding Mold>

Figure 3:
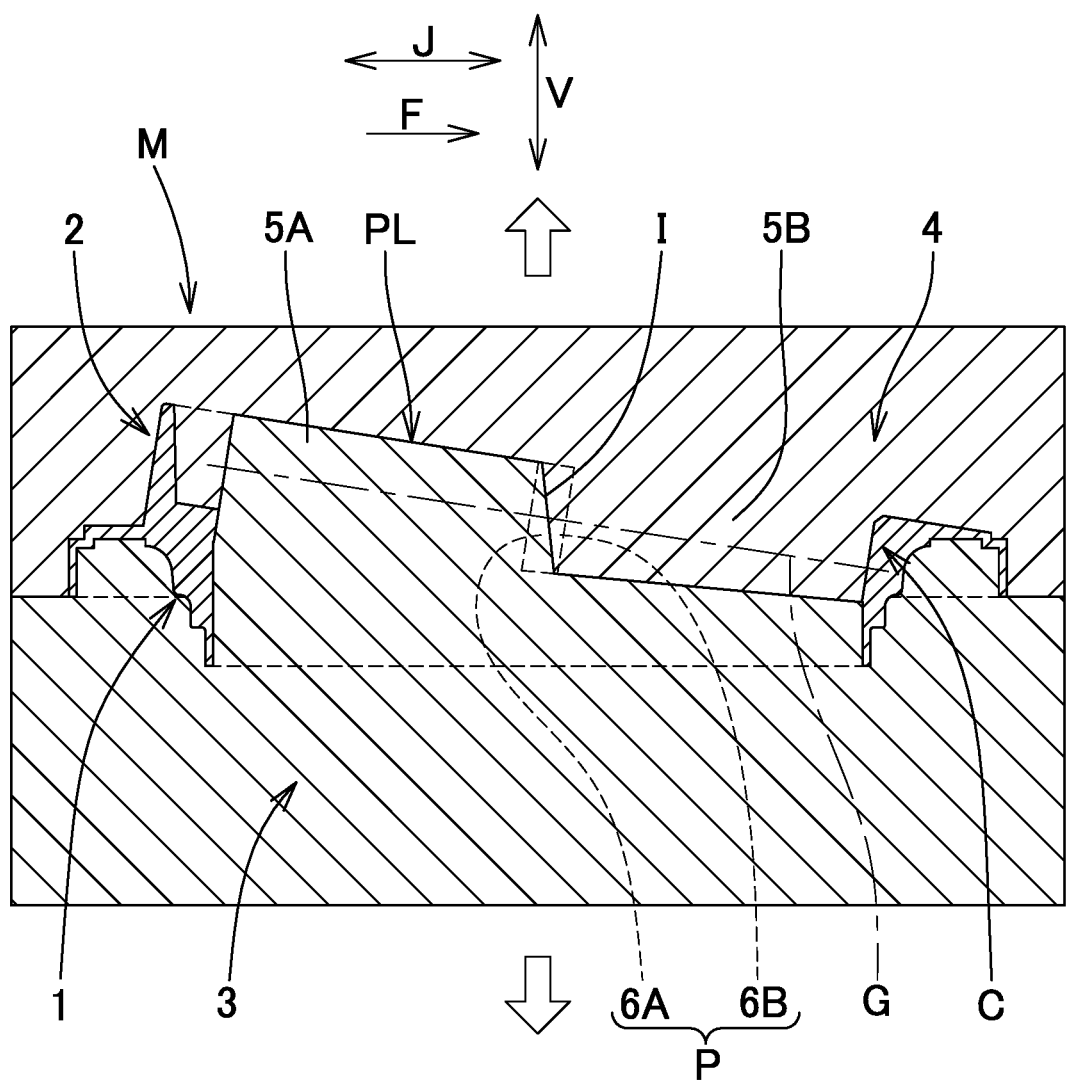
FIG. 3 is a vertical cross-sectional view of an injection molding mold used in the manufacturing method for an upper case of a strut bearing, according to the embodiment of the present invention.
Figure 4:
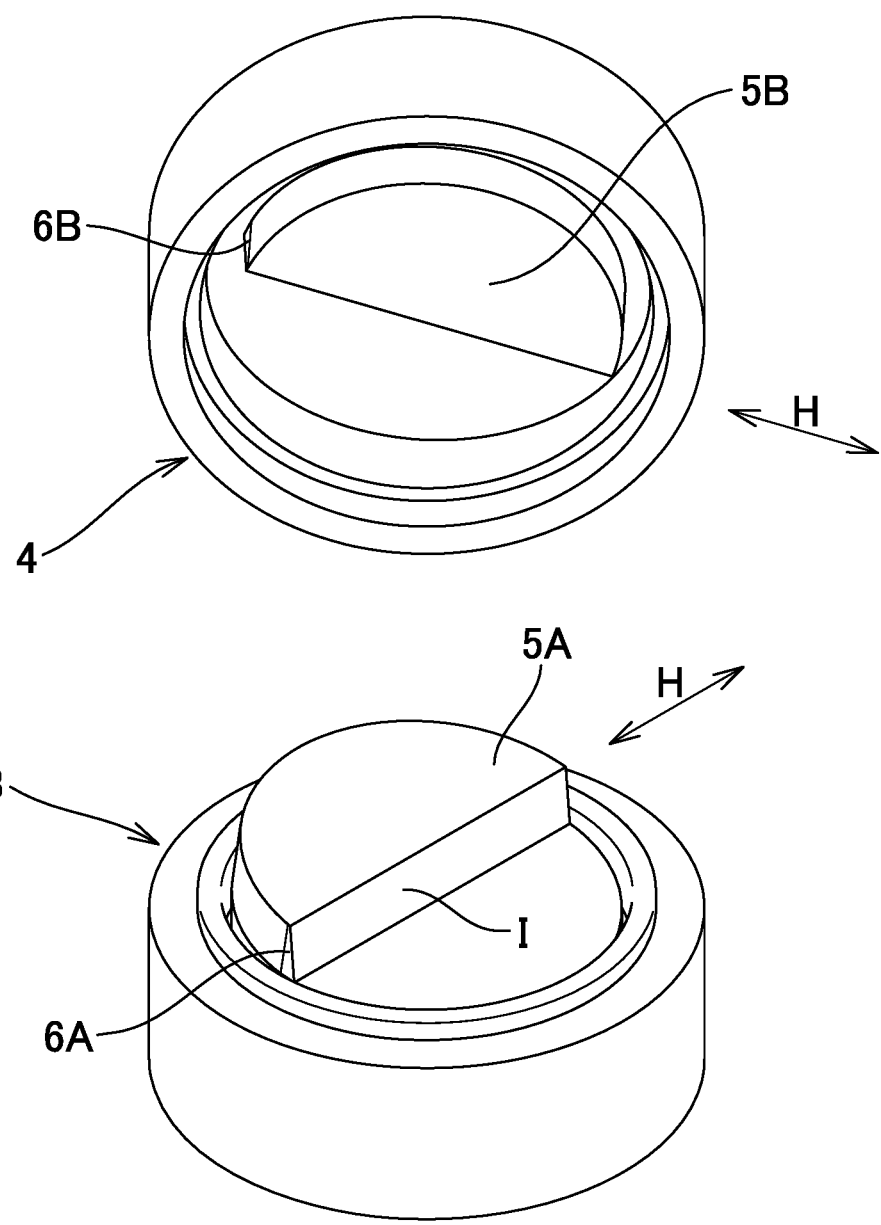
FIG. 4 is a perspective view showing a lower mold and an upper mold taken out from the injection molding mold.

As shown in the vertical cross-sectional view of FIG. 3 and the perspective view of FIG. 4, an injection molding mold M is an axial draw mold including a lower mold 3 serving as a fixed mold and an upper mold 4 serving as a movable mold. As the injection molding mold M composed of the fixed mold and the movable mold, there are a vertical mold that opens upward and downward and a horizontal mold that opens leftward and rightward. In the present embodiment, a case where the injection molding mold M is the vertical mold will be described.

In a state where the injection molding mold M is closed, rectangular flat surfaces P extending along the front-rear direction J and the up-down direction V are provided respectively on left and right sides (see the left-right direction H in FIG. 1A) of a central portion (the center and front and rear regions thereof), in the front-rear direction J, of parts of the lower mold 3 and the upper mold 4, which form an inner diameter 2A (FIGS. 1A and 1B) of the inclined cylindrical portion 2. An inner diameter-side parting line PL between the lower mold 3 and the upper mold 4 has a stepped-down shape having an inclined plane I. The inclined plane I descends in the forward direction F, and extends in the left-right direction H. The inclined plane I is located between the opposing left and right rectangular flat surfaces P, P. That is, both ends of the inclined plane I in the left-right direction H are located in the rectangular flat surfaces P.

The lower mold 3 is provided with a first half body 5A located on the rear side of the inclined plane I, and the upper mold 4 is provided with a second half body 5B located on the front side of the inclined plane I. Both ends in the left-right direction H of the first half body 5A, which are connected with the inclined plane I, form substantially triangular or substantially trapezoidal first flat surfaces 6A whose width increases downward. Both ends in the left-right direction H of the second half body 5B, which are connected with the inclined plane I, form substantially triangular or substantially trapezoidal second flat surfaces 6B whose width increases upward.

Figure 5:
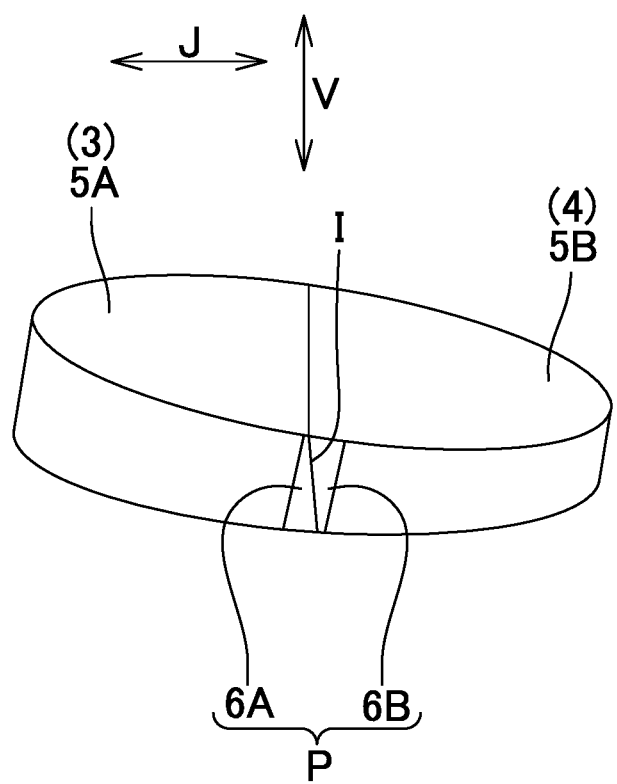
FIG. 5 is a perspective view showing only a first half body of the lower mold and a second half body of the upper mold.

FIG. 5 is a perspective view showing only the first half body 5A and the second half body 5B. In the state where the injection molding mold M is closed, as shown in FIG. 5, the first flat surface 6A and the second flat surface 6B are flush with each other at each of the left ends and each of the right ends of the first half body 5A and the second half body 5B, and form a rectangular flat surface P extending along the front-rear direction J and the up-down direction V "Rectangular" includes a trapezoid, a parallelogram, and the like that are similar to a rectangle. The rectangular flat surface P is provided in order to prevent undercutting.

That is, the first half body 5A of the lower mold 3 serving as a fixed mold and the second half body 5B of the upper mold 4 serving as a movable mold abut against each other in the inclined plane I. The first half body 5A has a first flat surface 6A at both ends on the inner diameter 2A side of the inclined cylindrical portion 2 in the inclined plane I, and the second half body 5B has a second flat surface 6B at both ends on the inner diameter 2A side of the inclined cylindrical portion 2 in the inclined plane. The first flat surface 6A and the second flat surface 6B forming the rectangular flat surface P are a flat surface that prevents the occurrence of undercutting when the upper case 1 is removed from the injection molding mold M.

(Angle of Inclined Plane)

The angle of the inclined plane I, which is the mating angle between the lower mold 3 and the upper mold 4, is preferably as large as possible from the viewpoint of the mold life. In contrast, providing the rectangular flat surface P causes a deviation from an ideal cylindrical shape, and therefore the rectangular flat surface P is preferably minimized. From such a perspective, the angle of the inclined plane I is preferably small. Therefore, the inclination angle of the inclined plane I with respect to a vertical plane including the left-right direction H is set to be less than 10°. If the injection molding mold M is a horizontal mold that opens leftward and rightward, the inclination angle of the inclined plane I with respect to a horizontal plane including the left-right direction H is set to be less than 10°.

SPECIFIC EXAMPLES OF RECTANGULAR FLAT SURFACE

Figure 6A:
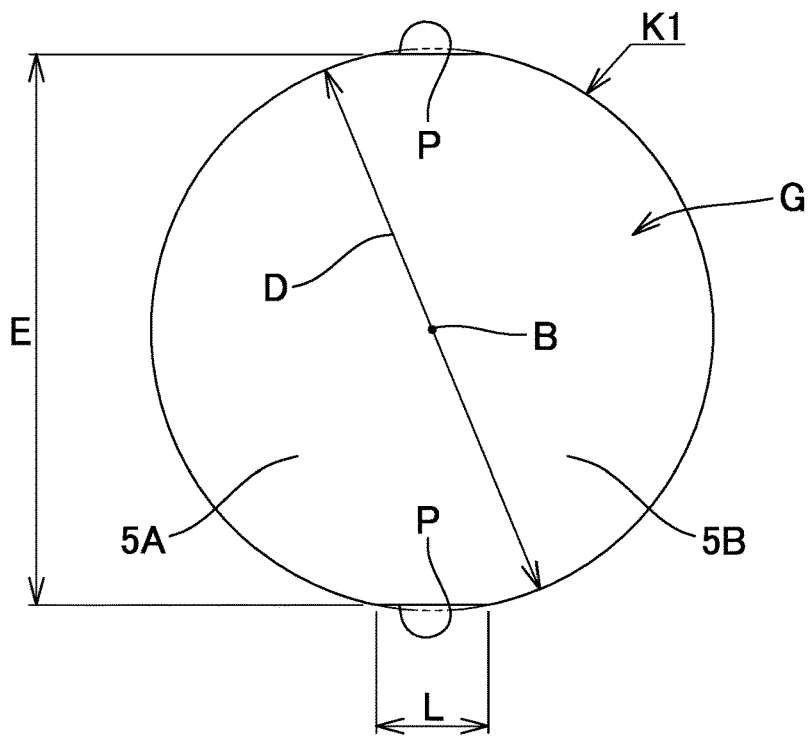
FIG. 6A is an explanatory diagram showing an example of the shapes of the first half body and the second half body, and shows the width of a rectangular flat surface in an exaggerated manner.
Figure 6B:
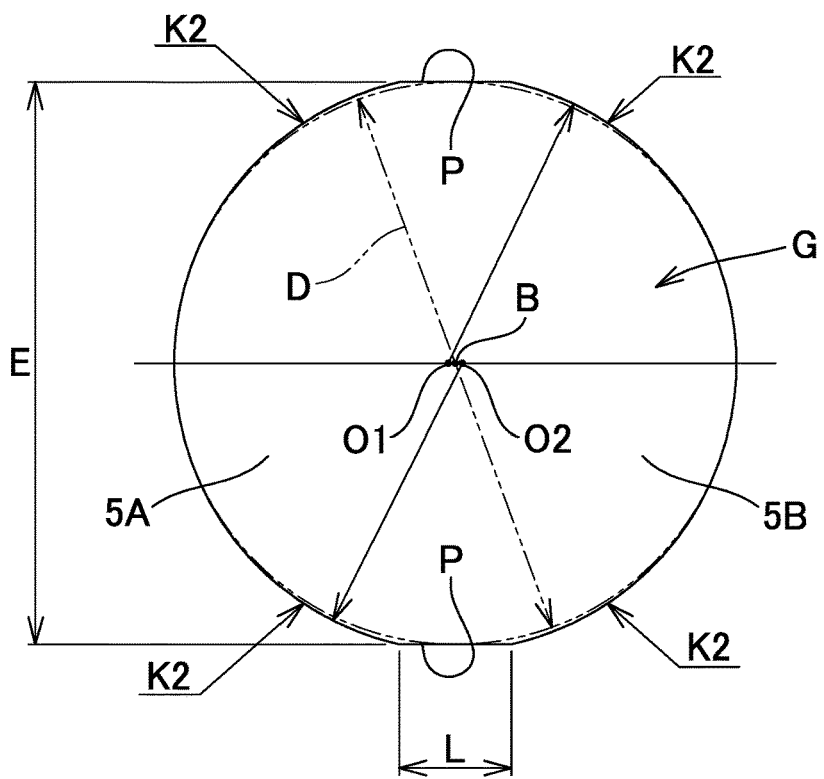
FIG. 6B is an explanatory diagram showing a modification of the shapes of the first half body and the second half body, and shows the width of a rectangular flat surface in the exaggerated manner.

FIGS. 6A and 6B are explanatory diagrams showing examples of the shapes of the first half body 5A and the second half body 5B. FIGS. 6A and 6B show the outer shapes of the first half body 5A and the second half body 5B at a cross section cut in a plane G (FIGS. 1B, 2, and 3) orthogonal to the central axis B of the inclined cylindrical portion 2, with the width L of the rectangular flat surface P being shown in an exaggerated manner. Although the parting line PL (inclined plane I) exists between the first half body 5A and the second half body 5B, the position of the parting line PL may vary depending on the position on the central axis B. Therefore, the parting line PL (inclined plane I) is omitted in FIGS. 6A and 6B.

First Example

In the example shown in FIG. 6A, an interval E between the left and right rectangular flat surfaces P, P is smaller than a diameter D of the outer shape of the first half body 5A and the second half body 5B (E<D). A curved surface K1 is a circumference of a circle having the diameter D.

Second Example

In the example shown in FIG. 6B, the interval E between the left and right rectangular flat surfaces P, P is greater than or equal to the diameter D of the outer shape of the first half body 5A and the second half body 5B (E≥D). A curved surface K2 is the circumference of a circle in contact with a circle with the diameter D, from centers O1, O2 displaced forward and rearward by an equal distance along the plane G from the central axis B of the inclined cylindrical portion 2.

(Size of Width of Rectangular Flat Surface P)

As described above, the rectangular flat surface P is preferably as small as possible, and therefore the width L of the rectangular flat surface P, or in other words, the length L of the rectangular flat surface P when the first half body 5A and the second half body 5B (the lower mold 3 serving as a fixed mold and the upper mold 4 serving as a movable mold) are cut in the plane G orthogonal to the central axis B of the inclined cylindrical portion 2 with the injection molding mold M being closed, is set to be less than or equal to 10% of the circumferential length of the first half body 5A and the second half body 5B (the lower mold 3 and the upper mold 4).

<Manufacturing Method for Upper Case>

(Injection Molding Step) After the injection molding mold M including the lower mold 3 and the upper mold 4 as shown in the vertical cross-sectional view of FIG. 3 has been clamped, an injection molding step is performed in which a molten resin material for molding the upper case 1 is injected from a gate (not shown) of the mold M into a cavity C of the mold M, to perform injection molding of the upper case 1.

(Cooling and Solidifying Step)

After the injection molding step has been performed, a cooling and solidifying step is performed in which the molten resin material is cooled while pressure is applied thereto.

(Molded Product Removal Step)

After the cooling and solidifying step has been performed, the injection molding mold M is opened. Specifically, the upper mold 4 serving as the movable mold is opened, and then a molded product removal step is performed in which the upper case 1, which is a molded product, is removed by being ejected by an ejector pin (not shown) disposed on the lower mold 3 serving as the fixed mold.

The rectangular flat surfaces Q shown in the perspective view of FIG. 1A and the vertical cross-sectional view of FIG. 1B are formed on the upper case 1 at positions corresponding to the left and right rectangular flat surfaces P of the first half body 5A and the second half body 5B.

<Effect>

As in the above-described embodiment, in the injection molding mold M which is an axial draw mold including a fixed mold and a movable mold, the first half body 5A of the fixed mold and the second half body 5B of the movable mold abut against each other in the inclined plane I. The first half body 5A has a first flat surface 6A at both ends on the inner diameter 2A side of the inclined cylindrical portion 2 in the inclined plane I, and the second half body 5B has a second flat surface 6B at both ends on the inner diameter 2A side of the inclined cylindrical portion 2 in the inclined plane I. The first flat surface 6A and the second flat surface 6B forming the rectangular flat surface P are flat surfaces that prevent the occurrence of undercutting when the upper case 1 is removed from the injection molding mold M.

Injection molding of the upper case 1 is performed using the injection molding mold M, which is the axial draw mold as described above, so that any undercut shape of the upper case 1 on the inner diameter side of the inclined cylindrical portion 2 can be eliminated. Accordingly, it is possible to prevent deformation or damage of the upper case 1, while using an axial draw mold having a commonly used mold structure. Thus, the mold structure will not be complicated, so that the initial cost and the maintenance cost of the mold can be reduced, and it is therefore possible to reduce the molding cost of the upper case 1 and increase the molding productivity.

The embodiments described above are all illustrative and not restrictive. Various improvements and modifications can be devised without departing from the scope of the present invention.

1 . . . Upper case
2 . . . Inclined cylindrical portion
2A . . . inner diameter
2B . . . End face
3 . . . Lower mold (fixed mold)
4 . . . Upper mold (movable mold)
5A . . . First half body
5B . . . Second half body
6A . . . First flat surface
6B . . . Second flat surface
7 . . . Lower case
8 . . . Upper raceway ring
9 . . . Lower raceway ring
10 . . . Rolling element
11 . . . Strut bearing
12 . . . Thinned-out portion
A . . . Central axis of strut bearing
B . . . Central axis of inclined cylindrical portion
C . . . Cavity
D . . . Diameter
E . . . Interval between left and right rectangular flat surface
F . . . Forward
G . . . Plane orthogonal to central axis of inclined cylindrical portion
H . . . Left-right direction
I . . . Inclined plane
J . . . Front-rear direction
K1, K2 . . . Curved surface
L . . . Width of rectangular flat surface
M . . . Injection molding mold
O1, O2 . . . Center
P . . . Surface (rectangular flat surface) defined by first and second flat surfaces
PL . . . Inner diameter-side parting line
Q . . . Rectangular flat surface
V . . . Up-down direction

What is claimed is:

1. A manufacturing method for an upper case of a strut bearing,
    the strut bearing including:
        an upper case to be fixed to an upper end portion of a strut of a vehicle strut suspension;
        a lower case to be directly or indirectly connected to a coil spring disposed on an outer side of the strut;
        an upper raceway ring held by the upper case;
        a lower raceway ring held by the lower case; and
        a rolling element that rolls between the upper raceway ring and the lower raceway ring;
        the upper case and the lower case being made of a synthetic resin; and
        the upper case including an inclined cylindrical portion inclined with respect to a central axis of the strut bearing, the inclined cylindrical portion having an inner surface having opposing flattened portions that interrupt an otherwise continuously curved inner surface of the upper case,
    the manufacturing method comprising:
        producing the upper case by injection molding using an injection molding mold that is an axial draw mold including a fixed mold and a movable mold; and
        providing the fixed mold with a first half body, and providing the movable mold with a second half body, wherein
        the first half body and the second half body abut against each other at respective first and second inclined planes,
        the first half body has a first flat surface and a second flat surface disposed at opposing exterior surface portions of the first half body, the first and second flat surfaces disposed at both ends of the first inclined plane,
        the second half body has a third flat surface and a fourth flat surface disposed at opposing exterior surface portions of the second half body, the third and fourth flat surfaces disposed at both ends of the second inclined plane,
        when the first inclined plane of the first half body is mated against the second inclined plane of the second half body, the first and third flat surfaces together form a first uniform flat surface and the second and fourth flat surfaces together form a second uniform flat surface, the first and second uniform flat surfaces create the opposing flattened portions that interrupt the otherwise continuously curved inner surface of the upper case, and the first and second uniform flat surfaces are flat surfaces that prevent occurrence of undercutting when the upper case is removed from the injection molding mold.

2. The manufacturing method for an upper case of a strut bearing according to claim 1, wherein when an inclination direction of a central axis of the inclined cylindrical portion with respect to the central axis of the strut bearing is a forward direction, the inclined plane extends in a left-right direction, an inclination angle of the inclined plane with respect to a vertical plane including the left-right direction is less than 10° if the injection molding mold is a vertical mold that opens upward and downward, and an inclination angle of the inclined plane with respect to a horizontal plane including the left-right direction is less than 10° if the injection molding mold is a horizontal mold that opens leftward and rightward.

3. The manufacturing method for an upper case of a strut bearing according to claim 1, wherein when the fixed mold and the movable mold are cut in a plane orthogonal to a central axis of the inclined cylindrical portion in a state where the injection molding mold is closed, a length of a rectangular flat surface formed by the first flat surface and the second flat surface is less than or equal to 10% of a circumferential length of the fixed mold and the movable mold.

4. The manufacturing method for an upper case of a strut bearing according to claim 2, wherein when the fixed mold and the movable mold are cut in a plane orthogonal to a central axis of the inclined cylindrical portion in a state where the injection molding mold is closed, a length of a rectangular flat surface formed by the first flat surface and the second flat surface is less than or equal to 10% of a circumferential length of the fixed mold and the movable mold.

5. A strut bearing comprising:

an upper case to be fixed to an upper end portion of a strut of a vehicle strut suspension;

a lower case to be directly or indirectly connected to a coil spring disposed on an outer side of the strut;

an upper raceway ring held by the upper case;

a lower raceway ring held by the lower case; and a rolling element that rolls between the upper raceway ring and the lower raceway ring, the upper case and the lower case being made of a synthetic resin, wherein the upper case includes an inclined cylindrical portion inclined with respect to a central axis of the strut bearing, and when an inclination direction of a central axis of the inclined cylindrical portion with respect to the central axis of the strut bearing is a forward direction, the upper case has rectangular flat surfaces respectively on left and right sides of a central portion in a front-rear direction on an inner diameter side of the inclined cylindrical portion.

* * * * *